United States Patent [19]

Laakso

[11] Patent Number: 4,521,315

[45] Date of Patent: Jun. 4, 1985

[54] PULP THICKENING UTILIZING STATIONARY SCREENS

[76] Inventor: Oliver A. Laakso, Haralyn (W.), #2 Middle Rd., Smiths Parish, Bermuda

[21] Appl. No.: 573,412

[22] Filed: Jan. 24, 1984

[51] Int. Cl.$^3$ .......................................... B01D 33/06
[52] U.S. Cl. ................................... 210/784; 210/297; 210/298; 210/330; 68/181 R; 162/251
[58] Field of Search ............... 210/297, 298, 330, 331, 210/333.1, 333.01, 405, 407, 388, 342, 456, 780, 784; 162/251; 68/181 R

[56] References Cited

U.S. PATENT DOCUMENTS

| | | | |
|---|---|---|---|
| 960,546 | 6/1910 | Hendryx | 210/298 |
| 1,380,114 | 5/1921 | Elliott | 210/297 |
| 1,516,702 | 11/1924 | Berry | 210/330 |
| 3,372,087 | 3/1968 | Richter | 162/251 |
| 3,524,551 | 8/1970 | Richter | 210/342 |
| 3,703,465 | 11/1972 | Reece et al. | 210/333.1 |
| 3,713,536 | 1/1973 | Kass | 210/333.1 |
| 4,076,623 | 2/1978 | Golston | 210/388 R |
| 4,100,069 | 7/1978 | Sherman | 68/181 R |

*Primary Examiner*—John Adee
*Attorney, Agent, or Firm*—Cushman, Darby & Cushman

[57] ABSTRACT

Thickening of paper pulp, or a like suspension, is effected prior to feeding the pulp to an apparatus utilizing stationary screens for effecting washing, bleaching, or further thickening of the pulp. The stationary screens are mounted in a top portion of a vertical-axis vessel, and a plurality of radially extending rotating hollow arms, with annular screens mounted on them, is provided in the bottom of the vessel to effect thickening of the suspension from, for example, 1½% consistency to about 9–14% consistency. Extraction from the hollow arms is provided through conduits extending vertically through a hollow shaft for rotating the arms, and a filtrate valve is also mounted within the hollow shaft in operative communication with the filtrate conduits, and includes a valve member which is rotatable in a different direction, and at a different speed, than the hollow shaft.

18 Claims, 5 Drawing Figures

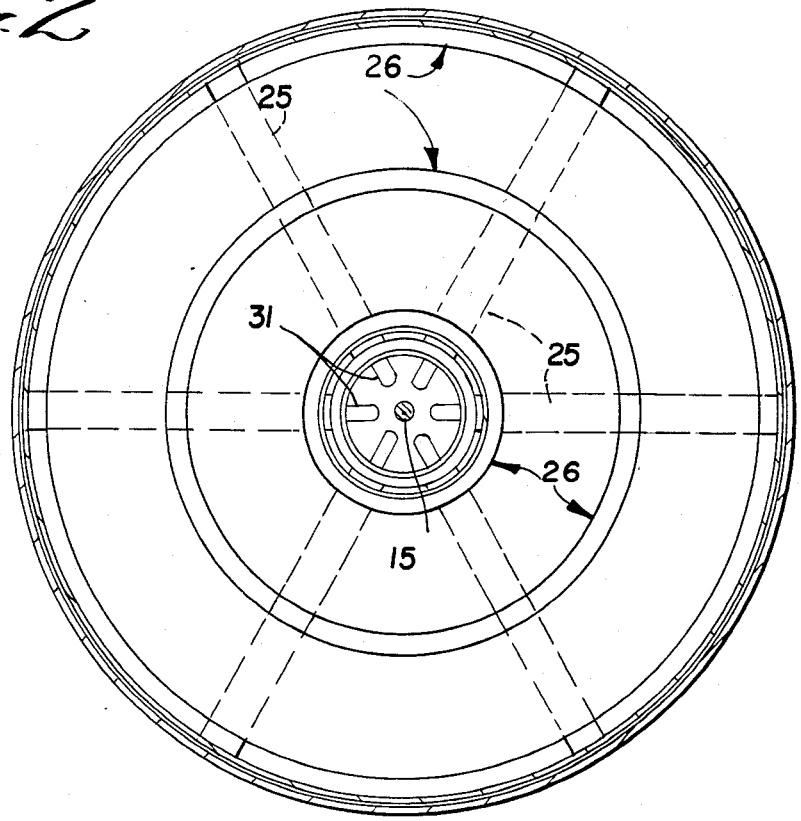
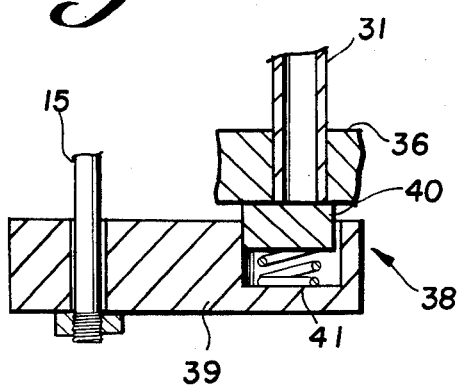
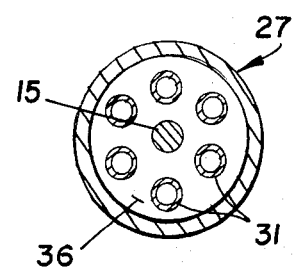
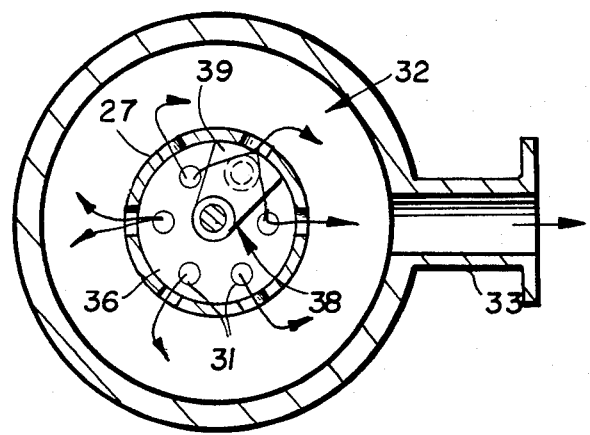

PULP THICKENING UTILIZING STATIONARY SCREENS

BACKGROUND AND SUMMARY OF THE INVENTION

The invention relates to a method and apparatus primarily adapted for treating a comminuted cellulosic fibrous material suspension, such as pulp for the production of paper. The invention primarily relates to the thickening of the suspension from a relatively low consistency (e.g., about 1½%), to a higher, more desirable consistency (e.g., between about 9–14%).

The invention is particularly adapted for use with the general apparatus illustrated and described in U.S. Pat. No. 4,441,224, the disclosure of which is hereby incorporated by reference herein. In that application, a simple and effective method and apparatus are provided for the treatment of a suspension, such as pulp suitable for use in making paper, utilizing stationary screens. The utilization of stationary screens as described in said application greatly simplifies the suspension treating procedure, yet no significant screen clogging—which would result in non-uniform treatment—occurs.

The basic apparatus disclosed in said copending application Ser. No. 374,763 includes an upright cylindrical vessel having a vertical axis, a plurality of annular, stationary screens disposed within the vessel and spaced from each other and from the axis; a plurality of radially extending extraction arms physically and hydraulically connected to the stationary annular screens, the extraction arms partitioning the vessel into a plurality of radial segments of substantially the same cross-sectional area, and the screens partitioning each radial segment into a plurality of vertically extending channels; and a suspension inlet means mounted below the extraction arms and the screens. Such a structure also includes a central shaft mounted for rotation within the vessel about its axis, and provides that each screen segment of each of the screen structures in a particular radial segment is hydraulically connected to the same extraction arm, and only a single extraction arm. A plurality of extraction conduits, one extending from each of the extraction arms, are provided, as well as extraction valve means for controlling the flow of liquid from each of the extraction arms.

According to the present invention, a method and apparatus are provided for thickening of the suspension, preferably between its introduction into the inlet means of the vessel described above, and prior to moving into operative relationship with the stationary annular screens of the vessel described above. The thickening means comprises a plurality of rotatable hollow arms, rotatable about said axis, the arms mounting a plurality of annular screens thereon, which screens are hydraulically connected to the hollow arms. As with the extraction arms and stationary screens, each screen segment of each of the screen structures in a particular radial segment defined by the hollow radially extending arm is hydraulically connected to the same hollow arm, and only a single hollow arm. A plurality of filtrate conduits, one extending from each of the hollow arms, are provided, as well as filtrate valve means for controlling the flow of filtrate from each of the hollow arms. Preferably, the number of rotatable hollow arms is half the number of extraction arms, and the hollow arms are rotated by a second, hollow, shaft in a direction—preferably but not necessarily opposite to the direction of rotation of the central shaft, and at a higher speed.

In the practice of the general method according to the present invention, the thickening of suspension from a low consistency (e.g., about 1½%) to a higher consistency (e.g., between about 9–14%) is practiced by rotating the second shaft connected to the hollow rotatable arms—with annular screens connected thereto—in the opposite direction as the central shaft. The central shaft is attached to a mechanism for extracting a portion of the entire radial extent of the suspension at the cross-sectional area of the top of the suspension column in the vessel, and at that part of the top of the column preceding the radial segment to which the suspension is being introduced after being thickened at the bottom of the column.

The present invention also relates to the thickening apparatus, per se, for accomplishing suspension thickening.

It is the primary object of the present invention to provide a simple and effective mechanism for the thickening of a suspension, such as pulp, primarily in a system utilizing stationary screens for the subsequent treatment of the suspension. This and other objects of the present invention will become clear from an inspection of the detailed description of the invention, and from the appended claims.

BRIEF DESCRIPTION OF THE DRAWINGS

FIG. 2 is a cross-sectional view taken along lines 2—2 of FIG. 1;

FIG. 3 is a cross-sectional view taken along lines 3—3 of FIG. 1;

FIG. 4 is a cross-sectional view taken along lines 4—4 of FIG. 1; and

FIG. 5 is a detailed view, partly in cross-section and partly in elevation, of a particular filtrate valve means in the structure of FIG. 1.

DETAILED DESCRIPTION OF THE DRAWINGS

Figure 1:
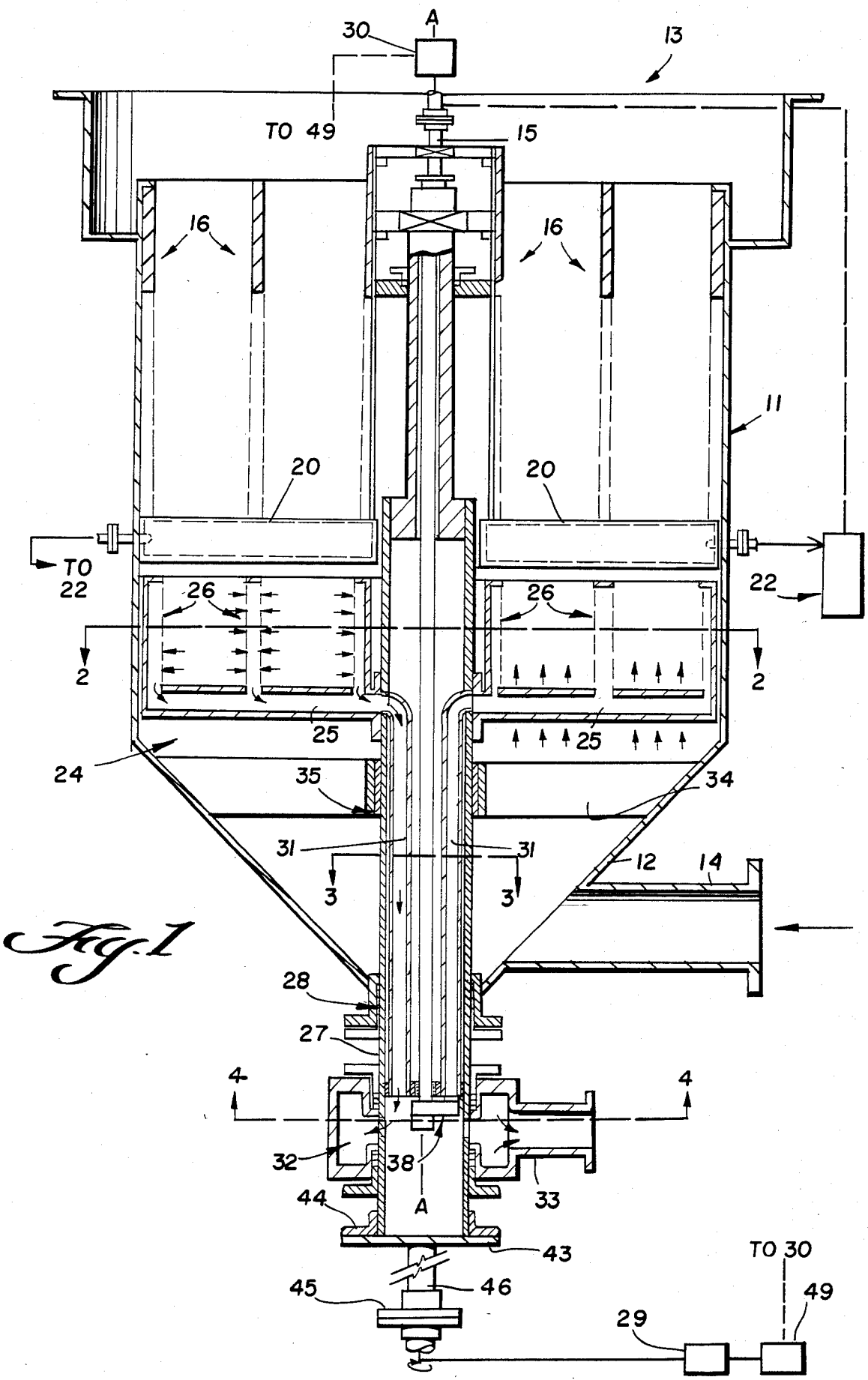
FIG. 1 is a side view, partly in cross-section and partly in elevation, of an exemplary diffusion apparatus utilizing an exemplary pulp thickening apparatus according to the present invention.

The method and apparatus according to the present invention are preferably utilizable in conjunction with the method and apparatus described in copending application Ser. No. 374,763, filed May 4, 1982, the disclosure of which is hereby incorporated by reference herein. The apparatus illustrated in that application includes a cylindrical generally upright vessel 11, having a bottom portion 12 into which the suspension to be treated is passed, and a top portion 13 from which treatment suspension is withdrawn. A suspension inlet structure 14 introduces the suspension to be treated into the vessel 11. A plurality of annular, stationary screens 16, concentric with the axis A—A of the vessel 11, are provided. The screens 16 are disposed within the vessel 11 and spaced from each other and from the axis A, and are physically and hydraulically connected to a plurality of radially extending extraction arms 20 (e.g., 12 extraction arms). The extraction arms 20 partition the vessel into a plurality of radial segments of substantially the same cross-sectional area, and the screens 16 partition each radial segment into a plurality of vertically extending channels.

The apparatus disclosed in said U.S. Pat. No. 4,441,224, also preferably includes a central rotating shaft 15 disposed along the vertical axis A—A of the vessel 11, to which a plurality of treatment-fluid introducing structures (not shown) may be attached, and to which a treated-suspension removal structure (not shown) is attached. The removal structure continuously removes from the top portion of the vessel 11 above the level of the screens 16 a portion of the entire radial extent of the suspension thereat. Extraction valve means 22 are provided for controlling the extraction of liquid from the arms 20.

According to the apparatus of the present invention, a suspension thickening means, shown generally by reference numeral 24 in FIG. 1, is provided mounted in the vessel 11 below the screens 16 and extraction arms 20, and above the suspension inlet 14. The rotating bottom pulp distributor column illustrated and described in said copending application is replaced by the thickening means 24, however the thickening means provides the same desired controlled introduction of pulp into operative association with the screens 16.

The pulp thickening means 24 comprises a plurality of hollow, radially extending, rotatable arms 25. These arms 25 partition the vessel 11 into a plurality of radial segments just like the extraction arms 20, only normally one-half the number of arms 25 would be provided as the number of arms 20 (e.g., six instead of twelve). Mounted to the arms 25 for rotation therewith are a plurality of annular screens 26, which partition each radial segment defined by the arms 25 into a plurality of vertically extending channels.

A second shaft 27 effects rotation of the arms 25, being received by bearings 28 at the bottom of vessel 11 for rotation with respect to the vessel 11, and being driven by a drive mechanism 29 distinct from—although in sync with (as will be hereinafter described-)—the drive mechanism 30 for the central shaft 15. The second shaft 27 preferably is hollow, and concentric with the central shaft 15, as illustrated in the drawings, and a plurality of filtrate conduits 31 extend therethrough. Each conduit 31 is physically and hydraulically connected at the top end thereof to an extraction arm 25, and rotates with the shaft 27 and the extractions arms 25. At the bottom end, each filtrate conduit 31 is connected to a filtrate outlet manifold 32, which in turn is connected to filtrate outlet pipe 33. Spider arms 34 within the vessel 11 between the suspension inlet 14 and the arms 25, also provide a bearing means 35 for the second shaft 27.

The bottoms of the filtrate conduits 31 are connected to a common annular support 36 (see FIGS. 1 and 3 through 5) and disposed in a circle. Support 36 is affixed to the interior of the second shaft 27. At the bottom of the support 36 is provided a filtrate valve means 38 (see FIGS. 1, 4 and 5) which is connected to the central shaft 15 for rotation therewith. As illustrated in FIG. 4, the valve means 38 preferably comprises an arcuate rotatable valve member 39 having a radial extent of approximately the same as the arcuate spacing between a pair of adjacent conduits 31, and—as illustrated in FIG. 5—preferably includes a wear member 40, of substantially the same arcuate extent as member 39, that is spring-pressed by one or more springs 41 into tight engagement the support 36 so that when member 40 covers a conduit 31 substantially no flow of filtrate through the conduit 31 into the header 32 takes place.

The rotatable annular screens 26 are preferably connected to the arms 25 in the same way that the screens 16 are connected to the extraction arms 20—that is, each screen segment of each annular screen 26 of a particular radial segment is hydraulically connected to the same hollow arm 25, and only a single arm 25. The filtrate valve means 38 controls the flow of filtrate from each of the arms 25. The valve means 38 is readily accessible by unbolting plate 43 from flange 44 connected to shaft 27 (see FIG. 1) and unbolting plate 45 of shaft segment 46 connected to drive 29, allowing free access to the interior of the second shaft 27 from the bottom thereof.

In the utilization of the thickener 24, the same principles apply as in said U.S. Pat. No. 4,441,224. That is in sequence the extraction through a given arm 25 is cut off at the same time extraction in the arm or arm 20 thereabove is cut off. Thus, the channelling and pulp movement in the desired area of the vessel 11 are controlled. The thickening means 24 preferably is rotated by shaft 27 and drive 29 in the opposite direction as the rotation of the shaft 15 (with associated treated-suspension removal structure) so that thickening shut-off is always moving into the up-flow zone. The rotation of the thickening means 24 also is preferably faster than the rotation of the shaft 15, for instance, the shaft 27 is rotated by drive 29 at 5-7 rpm while the shaft 15 is rotated by drive 30 at 2-3 rpm. The faster rotation of the thickening means provides a wiping action on the screens 26, and mixing action for the pulp within the thickening zone (i.e., adjacent the screens 26) so as to provide a uniform consistency of pulp moving upwardly past the screens 26. The pulp consistency must be uniform when it reaches the extraction arms 20.

As can be seen from an inspection of FIG. 1, when filtrate extraction through a conduit 31 is shut-off by the filtrate valve means 38 for any given arm 25, the thickened pulp will flow upwardly in the radial segment of the screen portions 26 connected to that given arm 25. The filtrate valve means 38 is synchronized with the extraction valve means 22 so that when the pulp is flowing upwardly past screens 26 to the upper part of the vessel 11, extraction through the arm 20 at the coincident upper part of the vessel 11 is also cut-off, so as to provide a maximum upflow pressure at that point. The synchronization can be accomplished in any desirable manner, for instance, by providing any suitable synchronizing control means 49 operatively connected to the drives 29 and 30, when the drive 30 and shaft 15 are operatively connected to the extraction valve means 22 (as illustrated in FIG. 1). Of course, other synchronizing means may also be provided, as described in said U.S. Pat. No. 4,441,224.

Other filtrate extraction mechanisms could also be utilized, aside from the particular extraction conduits 31 and associated valve means 38. For instance, extraction could be provided by headers and valve means in operative association with the outer ends of the arms 25 as they are rotated in their paths, and such valve means could be synchronized with the extraction valve means illustrated in FIG. 8 of said U.S. Pat. No. 4,441,224.

According to an exemplary method of the present invention, pulp at low consistency (e.g., from about 1½%) is fed through inlet 14 to flow upwardly in vessel 11. At approximately five-sixth's of the area within the bottom of the vessel 11, at the thickening screens 26, the pulp is thickened by filtrate being withdrawn therefrom, passing through screens 26 and arms 25, through conduits 31, header 32, and out through filtrate outlet 33. See the left-hand side of FIG. 1 at screens 26. At the other one-sixth of the area—see the right-hand side of FIG. 1 at screens 26—the filtrate valve means 38 has cut-off the extraction flow through one of the arms 25, and the pulp flows upwardly in that area to the diffuser portion of the vessel, defined by the stationary screens 16. Extraction into the upflow area through arms 20 is cut-off by the extraction valve means 22 for the particular radial segment of the vessel 11 where upflow is taking place, while there is continuous removal from a top portion of the vessel 11, above the level of the screens 16, a portion of the entire radial extent of the suspension at the top of the column preceding the radial segment into which the suspension is being introduced (flowing upwardly past the screens 26).

The relatively high speed of rotation (e.g., 5-7 rpm) of the screens 26 effects a wiping action, and imparts a turbulent, mixing, action to the pulp so as to provide uniform consistency when the pulp leaves the thickening means 24. When the pulp upflows from thickening means 24 into a particular upper radial segment of the vessel 11, it has a uniform consistency, preferably between about 9-14%, which is the optimum consistency for treatment in the diffuser section of the vessel 11.

It will thus be seen that according to the present invention a method and apparatus have been provided which effect the simple, uniform, and efficient thickening of a suspension, especially prior to the suspension moving into operative association with a stationary screen diffuser for washing or bleaching (or even further thickening) of the suspension.

While the invention has been herein shown and described in what is presently conceived to be the most practical and preferred embodiment thereof, it will be apparent to those of ordinary skill in the art that many modifications may be made thereof within the scope of the invention, which scope is to be according the broadest interpretation of the appended claims so as to encompass all equivalent structures, methods, and devices.

What is claimed is:

1. Apparatus for treating a suspension comprising: an upright cylindrical vessel having a vertical axis; a plurality of annular stationary screens disposed within said vessel and spaced from each other and from said axis; a plurality of radially extending extraction arms physically and hydraulically connected to said stationary annular screens, said extraction arms partitioning said vessel into a plurality of radial segments of substantially the same cross-sectional area, and said screens partitioning each radial segment into a plurality of vertically extending channels; a suspension inlet means mounted below said extraction arms and screens; and suspension thickening means mounted between said suspension inlet means and said extraction arms and stationary screens, and comprising a plurality of rotatable hollow arms partitioning said vessel into a plurality of radial segments of substantially the same cross-sectional area, and a plurality of annular rotatable screens physically and hydraulically connected to said hollow arms for rotation therewith.

2. Apparatus as recited in claim 1 further comprising a central shaft mounted for rotation within said vessel about said axis, and wherein said thickening means further include means for rotating said hollow arms independently of the rotation of said central shaft, said rotating means including a second shaft.

3. Apparatus as recited in claim 2 wherein each screen segment of each of said rotatable screens in a particular radial segment is hydraulically connected to the same, single, hollow arm, and only to said same, single, hollow arms; and further comprising a plurality of filtrate conduits, one extending from each of said hollow arms, and filtrate valve means for controlling the flow of filtrate from each of said hollow arm, and wherein said filtrate valve means are operatively connected to said central shaft; and wherein each screen segment of each of said stationary screen structures in a particular radial segment is hydraulically connected to the same, single, extraction arm, and only said same, single, extraction arm; and a plurality of extraction conduits, one extending from each of said extraction arms; and extraction valve means for controlling the flow of liquid from each of said extraction arms.

4. Apparatus as recited in claim 3 further comprising means for timing the actuation of said extraction valve means and said filtrate valve means so that within any particular radial segment of said vessel the flow of liquid through the extraction arm or arms associated with that segment, and the flow of filtrate through the filtrate arm or arms associated with that segment, are simultaneously cut-off.

5. Apparatus as recited in claim 3 wherein said second shaft is hollow, and wherein said filtrate conduits and filtrate valve means are disposed within said hollow second shaft.

6. A device as recited in claim 4 wherein there are one-half as many hollow arms as extraction arms.

7. A device as recited in claim 1 wherein there are one-half as many hollow arms as extraction arms.

8. Apparatus as recited in claim 5 wherein said filtrate conduits are connected at common ends thereof to a support structure positioning said conduits in a circle; and wherein said filtrate valve means comprises a rotatable arcuate valve member having an arcuate extent.

9. Apparatus as recited in claim 8 wherein the arcuate extent of said arcuate valve member is approximately equal to the arcuate spacing between two adjacent filtrate conduits.

10. Apparatus as recited in claim 8 wherein said arcuate valve member comprises an arcuate wear portion spring-biased into operative engagement with said filtrate conduits.

11. Apparatus as recited in claim 1 wherein each screen segment of each of said stationary screen structures in a particular radial segment is hydraulically connected to the same single extraction arm, and only said single extraction arm; and further comprising a plurality of extraction conduits, one extending from each of said extraction arms; and extraction valve means for controlling the flow of liquid from each of said extraction arms.

12. Apparatus as recited in claim 11 wherein each screen segment of each of said rotatable annular screen structures in a particular radial segment is hydraulically connected to the same, single, hollow arm, and only said, single, hollow arm; and further comprising a plurality of filtrate conduits, one extending from each of said hollow arms; and filtrate valve means for controlling the flow of filtrate from each of said filtrate arms; and means for synchronizing said extraction valve means and said filtrate valve means so that within a particular radial segment of said vessel the extraction of liquid through the extraction arm or arms associated with that radial segment, and the extraction of filtrate from the hollow arm or arms associated with that radial segment, are simultaneously cut-off.

13. Apparatus for effecting thickening of a suspension comprising:
- a first, central, shaft rotatable about a vertical axis;
- a second, hollow, shaft substantially concentric with said first shaft;
- an upright cylindrical vessel having a vertical axis, said shafts mounted in said vessel for rotation generally about said axis;
- a plurality of radially extending hollow arms connected to said second shaft for rotation therewith;
- a plurality of annular screens physically and hydraulically connected to said hollow arms;
- a suspension inlet conduit mounted below said arms and screens in said vessel;
- a plurality of filtrate conduits, one connected to each of said hollow arms; and
- filtrate valve means for controlling the flow of filtrate from said hollow arms through said filtrate conduits, said filtrate valve means including a rotatable valve member connected to said first shaft; and said filtrate valve means and said filtrate conduits disposed within said second shaft.

14. Apparatus as recited in claim 13 wherein said filtrate conduits are connected at common ends thereof to a support structure positioning said conduits in a circle; and wherein said filtrate valve means comprises a rotatable arcuate valve member having an arcuate extent.

15. Apparatus as recited in claim 14 wherein the arcuate extent of said arcuate valve member is approximately equal to the arcuate spacing between two adjacent filtrate conduits.

16. Apparatus as recited in claim 14 wherein said arcuate valve member comprises an arcuate wear portion spring-biased into operative engagement with said filtrate conduits.

17. Apparatus as recited in claim 14 further comprising means for rotating said first shaft in a first direction and a first speed, and means for rotating said second shaft in a second direction with a second speed, said second direction being opposite said first direction, and said second speed being higher than said first speed.

18. A method of continuously treating a suspension of comminuted cellulosic fibrous material in a cylindrical vessel utilizing stationary screens and movable treatment-fluid introduction structures and minimizing the potential for screen clogging, comprising the steps of continuously:
(a) defining a plurality of radial segments, and a plurality of vertical channels in each radial segment, in a top portion of the vessel;
(b) introducing a relatively low consistency suspension adjacent the vessel bottom to flow upwardly in the vessel in a moving suspension column, into a bottom portion of the vessel;
(c) effecting thickening of the suspension in the bottom portion of the vessel from its relatively low consistency to a uniform, higher, consistency of between about 9–14%, by: rotating a plurality of annular screens mounted on radially extending hollow arms, within the bottom portion of the vessel;
(d) periodically terminating thickening action in a particular radial segment so that the suspension flows upwardly into the top portion of the vessel corresponding to substantially the same radial segment;
(e) substantially continuously withdrawing liquid from the majority of the stationary screens area;
(f) terminating extraction from the stationary screens in each radial segment approximately when the suspension is being introduced therein from the bottom portion of the vessel, after thickening of the suspension;
(g) continuously removing from a top portion of the vessel, above the level of the screens, a portion of the entire radial extent of the suspension at the top of the column preceding the radial segment into which the suspension is being introduced, by: continuously rotating a removal structure at the top of the vessel; and
wherein the direction of rotation of the annular screens in the practice of step (c) is in a different direction, and at a greater speed, than the rotation of the removal structure in the practice of step (g).

* * * * *